United States Patent Office 2,782,227
Patented Feb. 19, 1957

2,782,227

POLYCARBOXYLATES

Joachim Dazzi, Dayton, Ohio, assignor to Monsanto Chemical Company, St. Louis, Mo., a corporation of Delaware No Drawing. Application August 28, 1950,
Serial No. 181,947

5 Claims. (Cl. 260—485)

The present invention relates to new polycarboxylic compounds and deals more particularly with addition or addition-cross-esterification products of esters of long-chained alkenols and certain acyclic olefinic acid compounds.

According to the invention there are provided new unsaturated polycarboxylates having the general formula $$T.CH_2.OOC.CY:CY.COOalk$$
$$\begin{bmatrix} Y.\overset{|}{C}.COOalk \\ Y.\overset{|}{C}.COOalk \\ \overset{|}{H} \end{bmatrix}_n$$

in which T is an alkenyl radical of from 9 to 23 carbon atoms, Y is selected from the class consisting of hydrogen and the methyl radical, alk is an alkyl radical of from 1 to 6 carbon atoms, and $n$ is an integer of from 1 to 3.

Esters of long-chained alkenols which are employed for the preparation of the present polycarboxylic compounds have the general formula $T.CH_2.OOC.Z$ in which T is an alkenyl radical of from 9 to 23 carbon atoms and Z is selected from the class consisting of alkyl radicals of from 1 to 6 carbon atoms and the radical —CY:CYCOOalkyl As illustrative of esters having this general formula may be mentioned undecenyl and oleyl acetate, propionate, butyrate, isobutyrate, n-valerate, isovalerate, n-hexoate, etc.

Acyclic olefinic acid compounds which react with the above alkenyl esters to yield the present polycarboxylic compounds are dicarboxylic di-alkyl esters in which the alkyl radical has from 1 to 6 carbon atoms; e. g., dimethyl, dibutyl or dihexyl maleate; diethyl, dibutyl or diamyl fumarate; dimethyl, diisopropyl or diisoamyl citraconate, etc.

With the dialkyl dicarboxylates there is not only an addition of the alkenyl ester to the double bond of the dicarboxylic component, but there also results a cross-esterification, substantially according to the scheme:

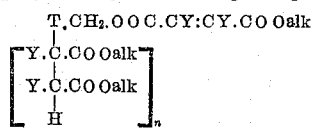

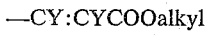

Here the alcohol portion of the long-chained mono-alkenyl ester probably is first interchanged for an alcohol portion of the dicarboxylic ester:

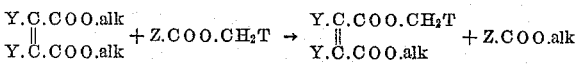

and the mixed dicarboxylate thus obtained further reacts as follows:

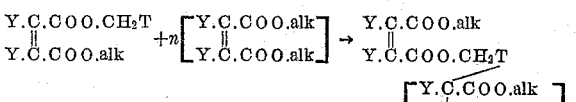

in which $n$ is a number of from 1 to 3.

The addition reaction generally takes place in the absence of catalysts, diluents or other extraneous materials. If desired, however, there may be added to the initial reaction mixture a small quantity, say, from 0.05 percent to 0.1 percent, based on the weight of the total of the two reactants, of an organic phosphorus compound, which has been found to have a stabilizing effect on the reaction. Thus, products of greater clarity and lighter color are usually obtained when operating in the presence of an ester of a phosphorus acid or in the presence of such color stabilizing compounds as phosphoric acid, ferrous sulfate, boric acid, etc.

In some instances, particularly, when employing solid or non-miscible reactants, the use of an inert, high-boiling diluent is advantageous.

The present polycarboxylic compounds are stable, high-boiling materials which range from viscous liquids to solid products. The present polycarboxylates are generally valuable as plasticizers for synthetic resins and plastics.

They are of outstanding value as plasticizers for vinyl chloride polymers, imparting simultaneously a high degree of low temperature flexibility, very good temperature stability and good mechanical strength to these polymers. The present esters are compatible with vinyl chloride polymers and show no exudation of plasticizer even at plasticizer content of up to 50 percent. Although the quantity of plasticizer will depend upon the particular polymer to be plasticized and upon its molecular weight, it is generally found that compositions having from 5 percent to 50 percent by weight of plasticizer will, in most cases, be satisfactory for general utility. The good flexibility of the plasticized compositions increases with increasing plasticizer concentration.

In evaluating plasticizer efficiency use is made of the following empirical testing procedures:

*Compatibility.*—Visual inspection of the plasticized composition is employed, incompatibility of the plasticizer with the polymer being demonstrated by cloudiness and exudation of the plasticizer.

*Hardness.*—A standard instrument made by the Shore Instrument Company is used for this determination and expresses the hardness in units from 1 to 100. The hardness of the composition is judged by its resistance to the penetration of a standard needle applied to the composition under a standard load for a standard length of time.

*Low temperature flexibility.*—Low temperature flexibility is one of the most important properties of elastomeric vinyl compositions. While many plasticizers will produce flexible compositions at room temperature the flexibility of these compositions at low temperatures may vary considerably, i. e., plasticized polyvinyl chloride compositions that are flexible at room temperature often become very brittle and useless at low temperatures. Low temperature flexibility tests herein employed are according to the Clash-Berg method. This method determines the torsional flexibility of a plastic at various temperatures. The temperature at which the vinyl composition exhibits an arbitrarily established minimum flexibility is defined as the Low Temperature Flexibility of the composition. This value may also be defined as the lower temperature limit of the plasticized composition's usefulness as an elastomer.

*Volatility.*—Just as a decrease in low temperature often results in decreased flexibility of a plasticized polymer composition so does a decrease in plasticizer concentration when caused by volatilization of the plasticizer. Hence, plasticizers which are readily volatilized from the plasticized composition as a result of aging or heating are inefficient because upon volatilization the plasticized compositions become stiff and hard. The test for plasticizer volatility herein employed is that described by the American Society for Testing Materials under the designation D–744–44T.

*Water resistance.*—The amount of water absorption and the amount of leaching that takes place when the plasticized composition is immersed in distilled water for 24 hours is determined.

The invention is further illustrated, but not limited, by the following examples:

*Example 1*

A mixture consisting of 124.2 g. (0.4 mole) of oleyl acetate and 1.0 mole of diethyl fumarate was charged to a vessel which was equipped with a Vigreux column and a Dean-Stark type trap fitted with a condenser; and the mixture was refluxed for about 14 hours. During this period 32.6 g. of a low boiling liquid, B. P. 70–90° C., $n_D^{25}$ 1.3842 (mostly ethyl acetate) was collected in the trap. An additional 0.4 mole of diethyl fumarate was then added to the reaction vessel, and the reaction mixture was again refluxed for 30 hours at a temperature of 230° C. to 245° C. There was thus collected an additional 6.3 g. of low-boiling material. Distillation of the product removed 67.4 g. of diethyl fumarate and gave as residue 245.5 g. of a material, which while bubbling nitrogen through it, boiled above an oil-bath temperature of 220° C. to 230° C./0.3 mm., had a saponification equivalent of 136.1, $n_D^{25}$ 1.4760 and a molecular weight of 644.5. Based on the recovered diethyl fumarate, 2.52 moles of diethyl fumarate have reacted, one mole of which participated in the cross-esterification and 1.52 moles of which added to the oleyl radical. Accordingly the present product is mono-ethyl mono-oleyl fumarate in which some of the hydrogens of the oleyl radical has been substituted by bis(1',2'-carboethoxy)ethyl radicals. The calculated molecular weight of mono-ethyl mono-oleyl fumarate having 1.52 of the bis(1',2'-carboethoxy)ethyl radicals is 656.7; found, 644.5 by molecular weight determination in benzene; calcd. saponification equivalent 131.3; found, 136.1; and the found free acid content of the 1.52 adduct is 1.06%.

*Example 2*

Sixty parts of polyvinyl chloride and 40 parts by weight of the butyl ester of Example 1 were mixed on a rolling mill to a homogeneous blend. During the milling there was observed substantially no fuming and discoloration. A molded sheet of the mixture was clear and transparent and substantially colorless. Testing of the molded sheet for low temperature flexibility, according to the testing procedure described above, gave a value of minus 0.5° C. which value denotes good low temperature properties. Tests on the volatility characteristics of the plasticized composition gave a value of 0.45 percent. The plasticized material had a hardness of 92 before the volatility test and a hardness of 92 after the volatility test. When subjected to heat at a temperature of 325° F. for a period of 30 minutes the clarity and color of the molded product were substantially unchanged. Tests of the water-resistance properties of the plasticized material employing the test procedure described above showed a solids-loss of only 0.03 percent and an 0.35 percent water absorption value.

Instead of the esters employed in the above examples, other esters obtained by the reaction of alkenyl esters with the present acyclic dicarboxylates give similarly valuable plasticized polyvinyl chloride compositions. Thus, by employing 40 parts by weight of the cross-esterified addition products obtained by reaction of undecyl acetate with dihexyl fumarate or diethyl citraconate, with 60 parts of polyvinyl chloride or with 60 parts by weight of a vinyl chloride-vinyl acetate copolymer known to the trade as "Vinylite," there are obtained clear, colorless, compositions of very good flexibility and stability.

While the above example shows only compositions in which the ratio of plasticizer to polymer content is 40:60, this ratio being employed in order to illustrate comparable efficiencies, the content of ester to polyvinyl chloride may be widely varied, depending upon the properties desired in the final product. For many purposes a plasticizer content of, say, from only 10 percent to 20 percent is preferred. The present esters are compatible with polyvinyl chloride over wide ranges of concentrations, up to 50 percent of esters based on the total weight of the plasticized composition yielding desirable products.

Although the invention has been described particularly with reference to the use of the present esters as plasticizers for polyvinyl chloride, these esters are advantageously employed also as plasticizers for copolymers of vinyl chloride, for example, the copolymers of vinyl chloride with vinyl acetate, vinylidene chloride, methyl methacrylate, acrylonitrile, etc. Preferably, such copolymers have a high vinyl chloride content, i. e., a vinyl chloride content of at least 70 percent by weight of vinyl chloride and up to 30 percent by weight of the copolymerizable monomer.

The plasticized polyvinyl halide compositions of the present invention have good thermal stability; however, for many purposes it may be advantageous to use known stabilizers in the plasticized compositions. Inasmuch as the present esters are substantially unreactive with the commercially available heat and light stabilizers which are commonly employed with polyvinyl chloride or copolymers thereof, the presence of such materials in the plasticized products does not impair the valuable properties of the present esters. The present esters are of general utility in softening vinyl chloride polymers. They may be used as the only plasticizing component in a compounded vinyl chloride polymer or they may be used in conjunction with other plasticizers.

What I claim is:

1. Polycarboxylic compounds having the formula

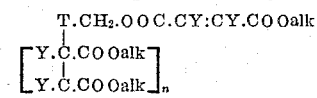

in which T is an alkenyl radical of from 9 to 23 carbon atoms, Y is selected from the class consisting of hydrogen and the methyl radical, alk is an alkyl radical of from 1 to 6 carbon atoms, and $n$ is a number of from 1 to 3.

2. The method which comprises heating an alkenyl ester having the general formula

T.CH₂.OOCZ in which T is an alkenyl radical of from 9 to 23 carbon atoms and Z is selected from the class consisting of alkyl radicals of from 1 to 6 carbon atoms and the radical —CY:CYCOOalk in which Y is selected from the class consisting of H and CH₃ and alk as an alkyl radical of from 1 to 6 carbon atoms, with a dicarboxylate having the general formula

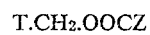

in which Y is selected from the class consisting of hydrogen and the methyl radical and alk is an alkyl radical of from 1 to 6 carbon atoms and recovering from the reaction product a polycarboxylate having the general formula

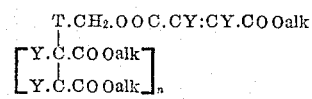

in which T is an alkenyl radical of from 9 to 23 carbon atoms, Y is selected from the class consisting of hydrogen and the methyl radical, alk is an alkyl radical of from 1 to 6 carbon atoms, and $n$ is a number of from 1 to 3.

3. Mono-alkyl mono[(1',2'-bis carboalkoxy)ethyl] octadecenyl fumarate in which each alkyl radical and each alkoxy radical has from 1 to 6 carbon atoms.

4. Mono-ethyl mono-oleyl fumarate in which from 1 to 3 hydrogen atoms of the oleyl radicals are substituted by a (1',2'-dicarboethoxy)ethyl radical.

5. The method which comprises heating oleyl acetate with diethyl fumarate and recovering from the resulting reaction product a mono-ethyl mono-octadecenyl fumarate in which from 1 to 3 hydrogens of the octadecenyl radical have been substituted by the (1',2'-dicarboethoxy)ethyl radical.

References Cited in the file of this patent

UNITED STATES PATENTS

| | | |
|---|---|---|
| 2,159,008 | Coleman et al. | May 23, 1939 |
| 2,380,699 | Kyrides | July 31, 1945 |
| 2,414,022 | Clifford et al. | Jan. 7, 1947 |
| 2,423,365 | Blair | July 1, 1947 |
| 2,485,281 | Gregory | Oct. 18, 1949 |
| 2,510,915 | Spurlin | June 6, 1950 |